United States Patent [19]

Kabayama

[11] Patent Number: 4,562,912

[45] Date of Patent: Jan. 7, 1986

[54] CLUTCH DISC

[75] Inventor: Yoshiaki Kabayama, Kadoma, Japan

[73] Assignee: Kabushiki Kaisha Daikin Seisakusho, Neyagawa, Japan

[21] Appl. No.: 568,682

[22] Filed: Jan. 6, 1984

[30] Foreign Application Priority Data

Jan. 6, 1983 [JP] Japan ................................. 58-616[U]

[51] Int. Cl.⁴ .............................................. F16D 3/14
[52] U.S. Cl. .............................. 192/106.2; 192/70.17; 464/68
[58] Field of Search .......................... 192/106.2, 70.17; 464/68

[56] References Cited

U.S. PATENT DOCUMENTS 3,266,271  8/1966  Stromberg ................... 192/106.2 X

FOREIGN PATENT DOCUMENTS 2069100A  8/1981  United Kingdom ............. 192/106.2

Primary Examiner—Samuel Scott
Assistant Examiner—Allen J. Flanigan
Attorney, Agent, or Firm—Armstrong, Nikaido, Marmelstein & Kubovcik

[57] ABSTRACT

The present invention discloses a clutch disc comprising a hub adapted to be connected to a shaft and provided at the outer periphery with an integral radial hub plate; a pair of hub flanges made of sheet metal, disposed at opposite sides of the hub plate with friction members therebetween and fitted at the inner peripheries onto the outer periphery of the hub; a stud pin connecting radially inner portions of the flanges together and projecting through a circumferentially long aperture in the hub plate; fixing means fixing radially outer portions of the flanges radially outside the hub plate together; weak elastic means disposed in openings provided in the flanges and the hub plate and circumferentially connecting the flanges and the hub plate together; side plates fixed together and disposed at outsides of the flanges with friction members therebetween; and strong elastic means disposed in openings in the flanges and the side plates and connecting the flanges and the side plates together.

3 Claims, 6 Drawing Figures

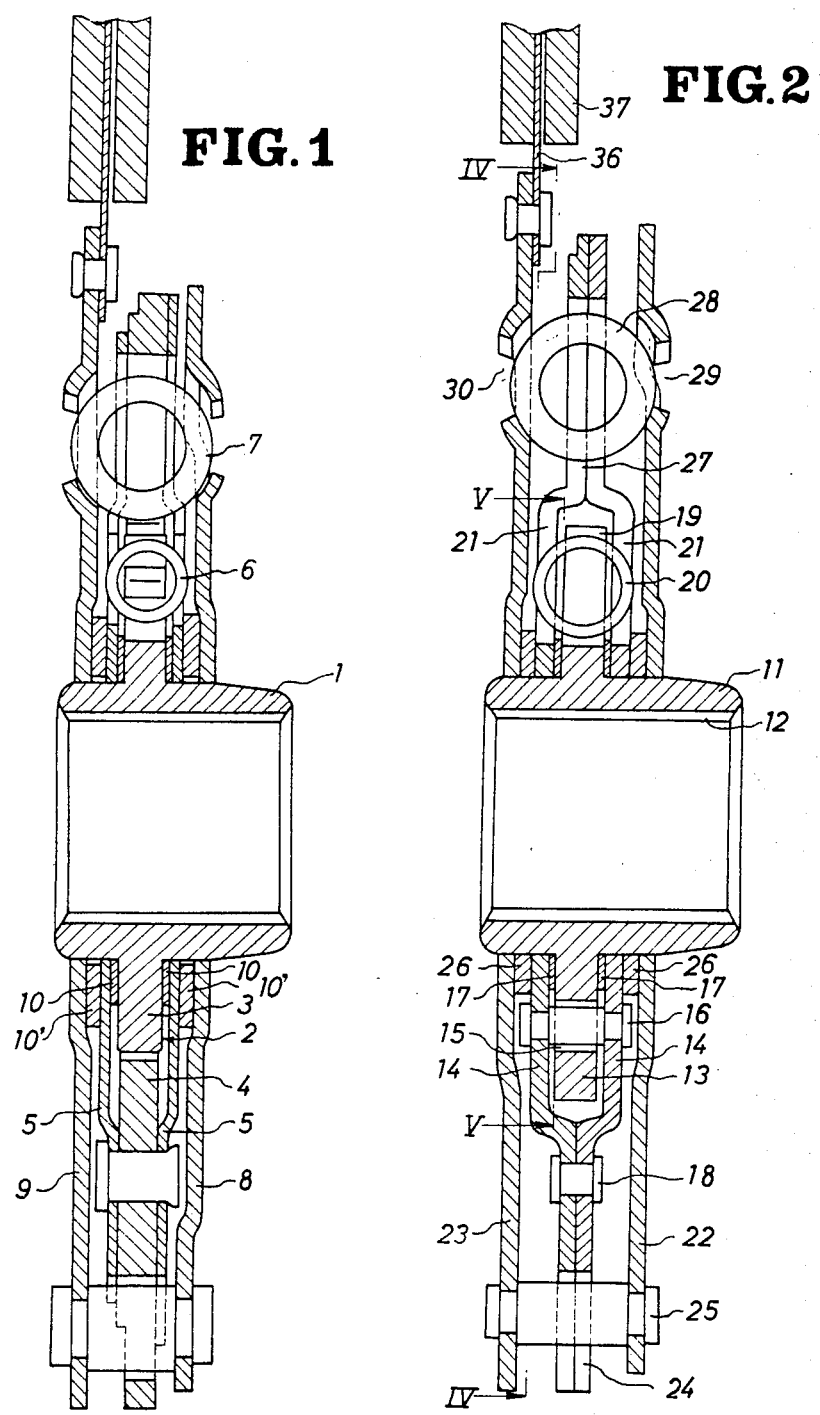

U.S. Patent Jan. 7, 1986 Sheet 2 of 4 4,562,912
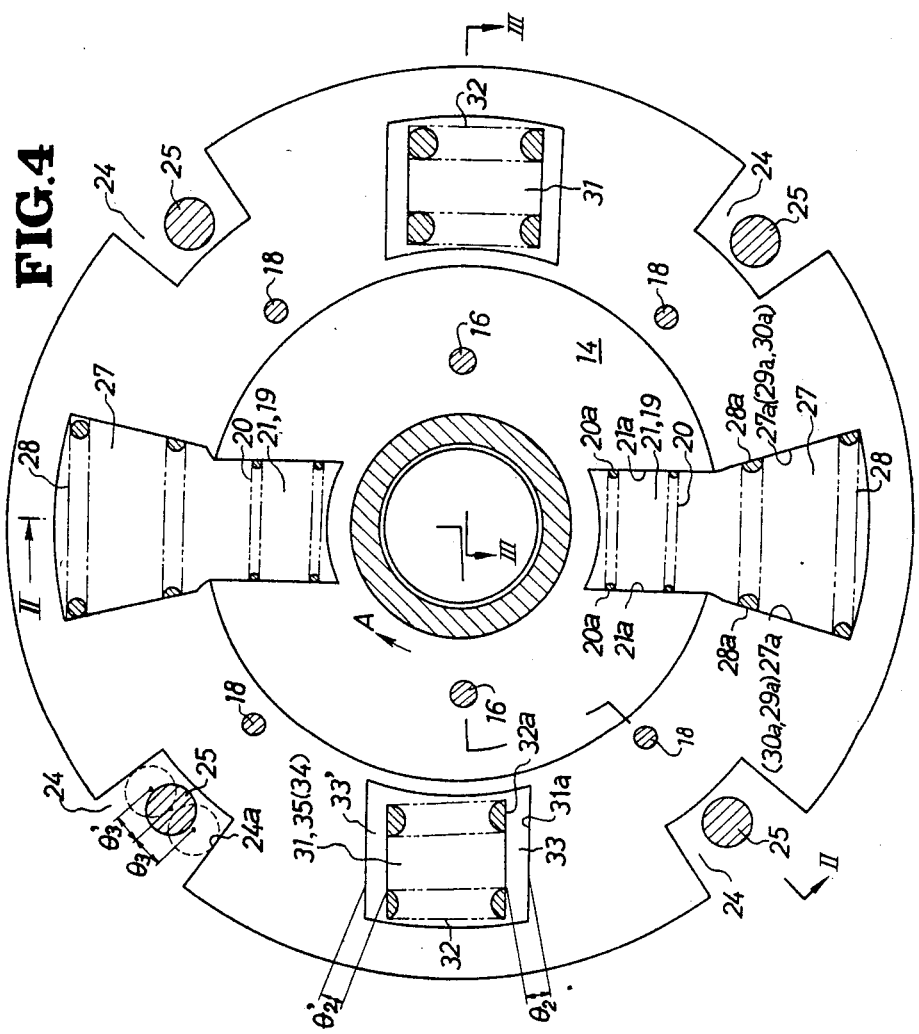

CLUTCH DISC

BACKGROUND OF THE INVENTION

The present invention relates to a clutch disc suitable for a friction clutch of an automobile.

Presently, light engines have been developed. However, the light engine generates large changes in torque which are transmitted through a clutch to driving mechanisms and may cause gear-attack noises in a transmission and a differential.

In order to solve the above problem, the applicant has already proposed a clutch disc in U.S. patent application Ser. No. 347,157 filed on Feb. 9, 1982, now U.S. Pat. No. 4,494,642. This clutch disc can sufficiently absorb the torque vibrations to reduce the noises in the gears.

In the clutch disc of the prior application, as shown in FIG. 1, a hub 1 has flange means 2 which is divided into an inner flange 3 formed integrally with the hub 1 and an outer flange 4. A pair of rather thin sub-plates 5 are fixed to both sides of the flange 4 and fitted to the outer periphery of the hub 1 to support the flange 4 with respect to the hub 1. Weak springs 6 for first torsion operation are disposed between the sub-plates 5 and the inner flange 3. Springs 7 for second and third operations are disposed between the outer flange 4 and the clutch and retaining plates 8 and 9.

In this disc, the clutch and retaining plates 8 and 9 torsionally turn or twist with respect to the flange 4 after the flange 4 turns through a predetermined angle with respect to the inner flange 3. Therefore, a maximum torsion angle can be sufficiently large. Since the springs 6 are soft with respect to the torsion of the flange, a rate of increase of torque with respect to increase of torsion angle is slow. Further, hysteresis torque changes in accordance with the change of the torsion angle. These features result in the advantage that the torque vibrations can be absorbed to reduce the noises in the gears.

However, in the clutch disc of large torsion angle and changeble hysteresi type, shown in FIG. 1, the flanges 3 and 4 are manufactured by forging, which increases costs. Further, it may be hard to position the flange 4 coaxially to the hub 1. Therefore, the springs 6 and 7 are also hard to be accurately positioned, and the sub-plates 5 may be broken. The pressures between the flange 3 and the sub-plates 5 are not stably fixed. Therefore, it is difficult to accurately generate an intended torque.

Accordingly, it is an object of the invention to provide an improved clutch disc, overcoming the above-noted disadvantages.

The essence of the invention is to provide hub flanges made of sheet metal and functioning also as conventional sub-plates.

BRIEF DESCRIPTION OF THE DRAWINGS

FIG. 1 is a sectional view of a conventional clutch disc;

FIG. 2 is a sectional view of a clutch disc of an embodiment according to the invention;

FIG. 3 is a sectional patial view illustrating other part of the disc of FIG. 2;

FIG. 4 is a sectional view taken along line IV—IV of FIG. 2;

DETAILED DESCRIPTION OF THE PREFERRED EMBODIMENTS

Figure 5:
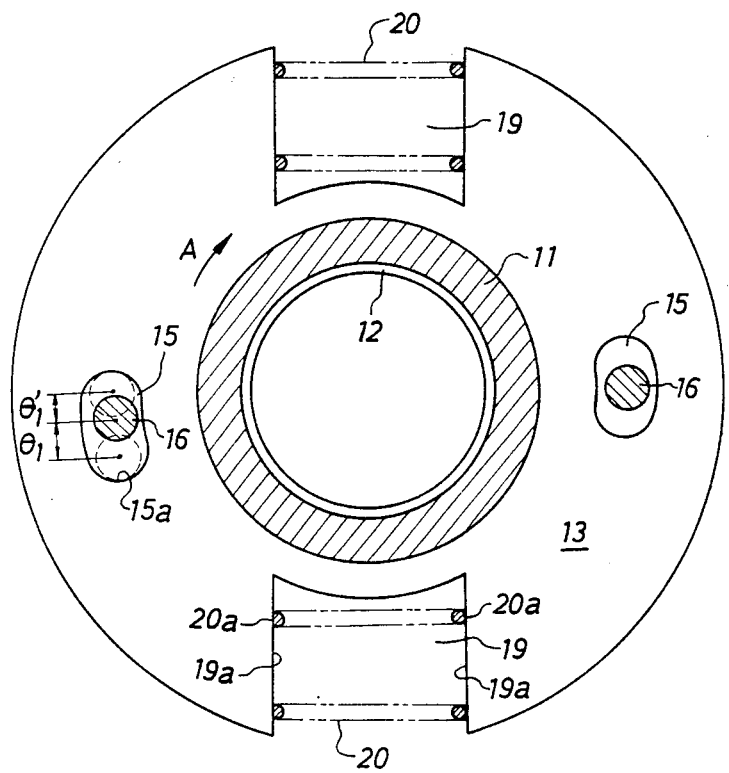
FIG. 5 is a sectional partial view taken along line V—V of FIG. 2.

Referring to FIG. 2, a splined hub 11 is adapted to be splined to an clutch shaft (not shown) and is provided at the outer periphery with an integral hub plate 13. A pair of annular hub flanges 14, which are made of sheet metal and formed by a press, are disposed at opposite sides of the hub plate 13 and are rotatably fitted at the inner peripheries onto the outer periphery of the hub 11. The radially inner portions of the flanges 14 are positioned at opposite sides of the plate 13 and are connected together by two rivets 16 (stud pins) projecting respectively through arc shaped long aperture 15 shown in FIG. 5. As shown in FIG. 2, the inner peripheral portions of the flanges 14 are pressed to the side surfaces of the plate 13 with wave springs 17 or other friction members therebetween. The radially middle portions of the flanges 14 are bent. Radially outer portions of the flanges 14 are fully and directly contact with each other and are fixed together by circumferentially spaced four rivets 18. (FIG. 4).

The hub plate 13 is provided with two openings 19 provided at diametrally opposite portions on a same circle. Weak and soft springs 20 for first torsion operation are disposed in the openings 19 respectively. Each first spring 20 extends parallel to a tangent of the disc. Diametrically opposing portions of each spring 20 project out of the opening 19 and engage with openings 21 in flanges 14. The openings 19 and 21 are registered in the axial direction of the disc when the disc is in a illustrated neutral condition, so that the ends 20a of the springs 20 engage with end faces 19a and 21a of the openings 19 and 21, respectively.

As shown in FIG. 2, a retaining plate 22 and a clutch plate 23 are disposed at opposite sides of the flanges 14, are fixed together, and are fitted at the inner peripheries onto the outer periphery of the hub 11. Radially outer portions of the plates 22 and 23 are connected together by four stop pins 25, which project through recesses 24 provided at outer peripheral portions of the flange 14. Inner peripheral portions of the plates 22 and 23 are pressed to the flanges 14 with friction washers 26 therebetween.

As shown in FIG. 4, the flanges 14 are provided with two or two sets of openings 27, which open and continue to the radially outer ends of the openings 21, respectively. The second springs 28 are disposed in the openings 21. Diametrically opposing portions of each spring 28 project out of the opening 27 and engage with openings 29 and 30 (FIG. 2) provided in the retaining and clutch plates 22 and 23. In the illustrated neutral position, end faces 27a, 29a and 30a of the openings 27, 28 and 30 are registered in the axial direction of the disc and contact the ends of the springs 28.

The flanges 14 are also provided with another two openings 31, in which third torsion springs 32 are disposed with circumferential spaces 33 and 33′ therebetween, respectively. The springs 32 are also fitted in openings 34 and 35 provided in the plates 22 and 23 and engage with end faces of the openings 34 and 35.

As shown in FIG. 2, cushioning plates 36 are fixed to outer peripheral portions of the clutch plate 23. Friction facings 37 are fixed to opposite surfaces of the plates 36. The facings 37 are positioned between a flywheel (not shown) of an engine and a pressure plate (not shown).

The operation of the preferred embodiment of the clutch disc of the invention will be explained in the following description. In order to transmit rotational force of the engine to wheel drive shafts, the facing 37 of the disc is pressed against the flywheel by the pressure plate, so that the force or torque is transmitted to the clutch shaft through the splined hub 11. However, in order to simplify explanation, the operation is described as if the torque is transmitted to the facings 37 from the hub 11. When the torque of a direction shown by an arrow A (FIGS. 4 and 5) is introduced, initially, the weak first springs 20 are compressed, because the flanges 14 and the plates 22 and 23 are connected through strong springs 28. The torque is transmitted from the hub 11 to the facings 37 through the plate 13, the springs 20, the flanges 14, the springs 28, the plates 22 and 23 and the plates 36. Since the springs 20 are soft as stated above, the rate of increase of torsional torque T (transmitted torque) with respect to the increase of torsion angle D is slow as shown by a line T1 in FIG. 6. When the torsion angle increases to a value of $\theta 1$, the rivets 16 engage with the end faces 15a of the apertures 15. Thereafter, the flanges 14 are integrally connected to the hub plate 13, and the second springs 28 start to be compressed. When the flanges 14 turn through an angle of $\theta 2$ together with the plate 13, the spaces 33 are reduced to zero and the end faces 31a of the openings 31 engage with the ends 32a of the springs 32. Thereafter, the third springs 32 start to be compressed. When the flanges 14 turns through an angle $\theta 3$ together with the plate 13, the stop pins 25 contact the end faces 24a of the recesses 24, so that all members of the disc are integrally connected together and the torsion angle reaches a maximum value.

Figure 6:
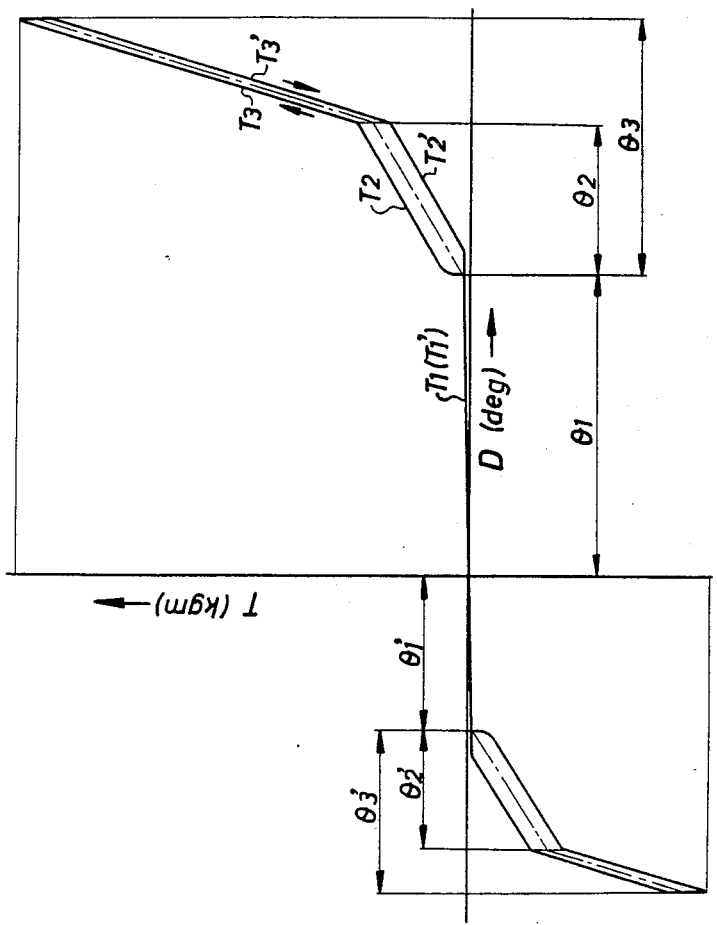
FIG. 6 is a graph showing torsion characteristics of the disc of the invention.

First hysteresis torque is caused by friction between the flanges 14 and the plate 13. Second and third hysteresis torque is caused by friction between the flanges 14 and the plates 22 and 23. As the torsion angle decreases from the maximum value, the torsion torque decreases as shown in lines T3', T2' and T1' in FIG. 6. Since the first hysteresis torque is very small, both kinds of torque T1 and T1' are illustrated by the same line in FIG. 6. The left half of FIG. 6 shows the torque characteristic when the angle changes in the opposite (negative) direction.

According to the invention, as described hereinbefore, the disc has following features and advantages in comparison with the disc shown in FIG. 1.

(a) Since the hub flanges 14 are made of the sheet metal and sub-plates are eliminated, the manufacturing costs can be small and the number of the parts and members can be reduced.

(b) Since the flanges 14 are fitted onto the outer periphery of the hub 11, the centering or coaxial positioning of the flanges 14 can be easy and accurate. Therefore, the springs 20, 28 and 32 can be accurately positioned, and the flanges 14 are prevented from breakage.

(c) Since the radially inner portions of the flanges 14 are fixed together by the rivets 16 and are pressed to the hub plate 13 with the friction members (17) therebetween, the pressure between the flanges 14 and the plate 13 can be stable, resulting in an advantage that the first hysteresis torque can be determined stably.

(d) The torsion and hysteresis characteristics bring advantages that torque vibration can be effectively absorbed and gear-attack noises can be prevented.

In a modification of the invention, rubber may be used instead of or together with the springs. The openings 21 and 27 in the flanges 14 may be formed separately to each other so that they may not continue to each other. The number of the openings 21, 27 and 31 may be changed in consideration of the strength of the flanges 14 and others. Such torsion spring means may be employed that the inclination of the characteristic line changes one, three or more times. If the springs for the last (third) operation are strong enough, the stop pins 25 may be eliminated and the plates 22 and 23 may be directly fixed together at bent portions by rivets or welding. The plates 22 and 23 may be fixed together with a spacer therebetween. Friction washers may be substituted for the wave springs 17.

Although the invention has been described in its preferred form with a certain degree of particularity, it must be understood that the details of construction may be changed and the combination and arrangement of parts may be varied without departing from the scope of the invention as hereinafter claimed.

What is claimed:

1. A clutch disc comprising a hub adapted to be connected to a shaft and provided at the outer periphery with an integral radial hub plate; a pair of hub flanges made of sheet metal, disposed at opposite sides of the hub plate with friction members therebetween and fitted at the inner peripheries onto the outer periphery of the hub; a stud pin connecting radially inner portions of the flanges together and projecting through a circumferentially long aperture in the hub plate; fixing means fixing radially outer portions of the flanges together radially outside of the hub plate; relatively weak elastic means disposed in openings provided in the flanges and the hub plate and circumferentially connecting the flanges and the hub plate together; side plates fixed together and disposed at opposite sides of the flanges with friction means therebetween; and relatively strong elastic means disposed in openings in the flanges and the side plates and connecting the flanges and the side plates together; said relatively weak elastic means being isolated from said side plates so that no direct mechanical connection exists therebetween, whereby any resistance to torque ultimately exerted on said side plates by said relatively weak elastic means is exerted indirectly via a torsional path which includes said flanges, said friction means and said relatively strong elastic means.

2. A clutch disc of claim 1 wherein a space corresponding to a predetermined first torsion angle is formed between said stud pin and end face of said hub plate.

3. A clutch disc of claim 1 wherein said hub flanges are provided at the radially middle portion near the outer periphery of the hub plate with a bent portion, and the full surfaces of the radially outer portions of the flanges joint with each other.

* * * * *